United States Patent [19]
Hashida

[11] Patent Number: 5,320,423
[45] Date of Patent: Jun. 14, 1994

[54] ANTI-LOCK HYDRAULIC CONTROL DEVICE

[75] Inventor: Koichi Hashida, Itami, Japan

[73] Assignee: Sumitomo Electric Industries, Ltd., Osaka, Japan

[21] Appl. No.: 106,712

[22] Filed: Aug. 16, 1993

[30] Foreign Application Priority Data

Aug. 25, 1992 [JP] Japan .................................. 4-225677

[51] Int. Cl.$^5$ .............................................. B60T 8/32
[52] U.S. Cl. ................................ 303/113.5; 188/349; 303/9.75; 303/111; 303/116.4
[58] Field of Search ...................... 303/113.5, 111, 100, 303/116.1, 113.2, 93, 105, 110, 9.62, 9.75, 116.3, 116.4, 92, 10; 188/349, 181 A

[56] References Cited

U.S. PATENT DOCUMENTS

| | | |
|---|---|---|
| 4,740,039 | 4/1988 | Hattwig .......................... 303/113.5 |
| 5,163,743 | 11/1992 | Leppek et al. ................. 303/113.5 X |
| 5,167,441 | 12/1992 | Schonlau et al. ............. 303/113.5 X |
| 5,242,216 | 9/1993 | Miyawaki et al. . |

FOREIGN PATENT DOCUMENTS

5572 1/1993 Japan .

Primary Examiner—Douglas C. Butler
Attorney, Agent, or Firm—Sandler, Greenblum & Bernstein

[57] ABSTRACT

An anti-lock hydraulic control device is composed of a front-wheel brake and rear-wheel brake for effecting brake control through a hydraulic system which is connected with a master cylinder and circulates hydraulic fluid; a front-wheel side control valve and rear-wheel side control valve between the master cylinder and front-wheel brake, and master cylinder and rear-wheel brake respectively; a reserve between the front-wheel side control valve and rear-wheel side control valve; a proportioning valve between the master cylinder and rear-wheel side control valve; and a pump connected to the reserve and provided with a discharge opening connected between the proportioning valve and the rear-wheel control valve. When anti-lock control starts, the pump operates and discharges hydraulic fluid to the rear-wheel side control valve, thus increasing rear-wheel brake fluid pressure, and so avoiding the problem of insufficient braking power in the rear-brakes during anti-lock control, and increasing braking efficiency.

3 Claims, 5 Drawing Sheets

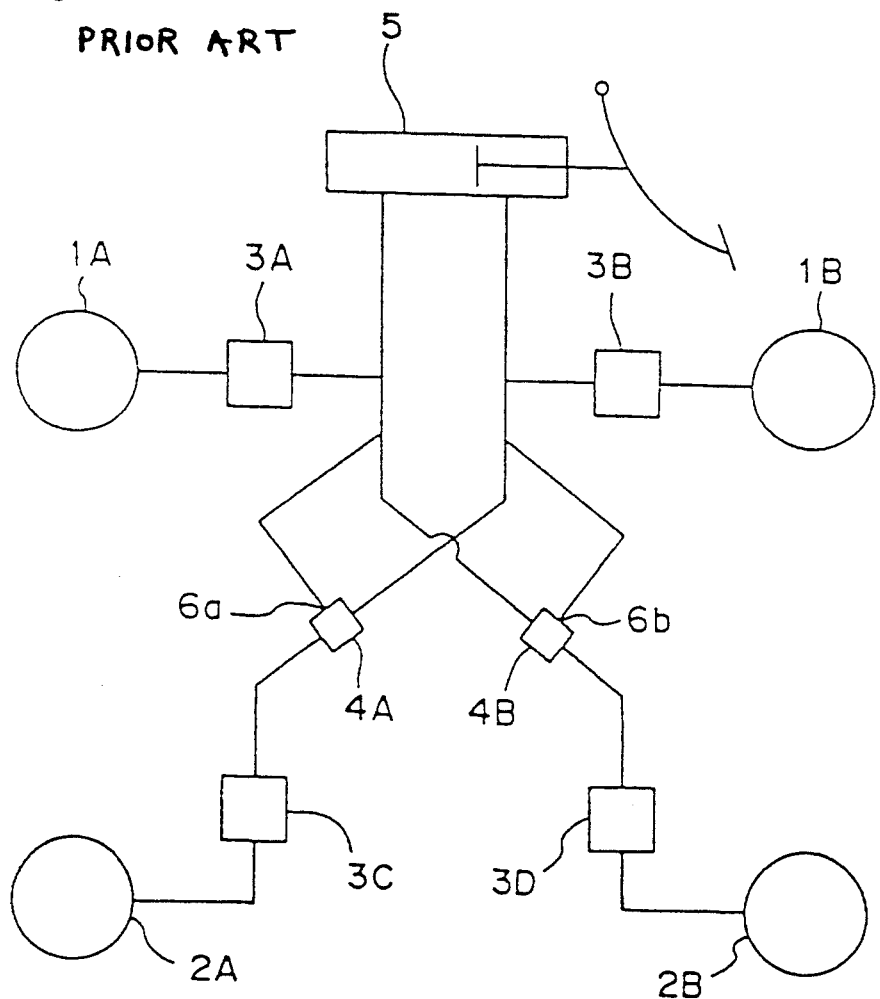

ANTI-LOCK HYDRAULIC CONTROL DEVICE

BACKGROUND OF THE INVENTION

The present invention relates to an anti-lock hydraulic control device, and more particularly to providing more suitable hydraulic distribution to the front-wheel and rear-wheel brakes, and improving braking efficiency.

Anti-lock hydraulic devices are conventionally provided with a proportioning valve (hereinafter abbreviated to "P-valve") for reducing output fluid pressure in proportion to inlet fluid pressure.

The P-valve has the function of appropriately setting distribution between rear-wheel brake fluid pressure and front-wheel brake fluid pressure, so as to prevent the car losing stability due to the rear wheels locking before the front wheels. The P-valve is therefore essentially unnecessary if an anti-lock hydraulic control device is installed.

However, the imbalance in braking power between the front wheels and rear wheels means that the anti-lock hydraulic control device is actuated to lock at the earliest stage even if the coefficient is relatively high, i.e., the condition of deaccelerating speed being small. Thus to prevent discomfort associated with noise and vibrations generated when the anti-lock hydraulic control device functions at an early stage, notwithstanding road-surface conditions which make locking less likely to occur in the first place, and to prevent the car losing stability when the anti-locking device is faulty and the rear wheels lock before the front wheels, P-valves are often provided in spite of the provision of anti-lock hydraulic control devices.

FIG. 6 shows an example of an anti-lock hydraulic control device with P-valves as described above.

The anti-lock hydraulic device is constructed of X-circuit. The front-wheel brakes 1A, 1B and the rear-wheel brakes 2A, 2B on the left and right sides have anti-locking devices (ABS devices) 3A, 3B, 3C, 3D respectively, and P-valves 4A, 4B are disposed between the rear-wheel brakes 2A, B and the master cylinder 5.

The pressure detection holes 6a, 6b in the respective P-valves 4A, 4B are connected with the outlet side of the master cylinder 5 of the other circuit. It is not always necessary to provide the holes 6a, 6b, and it may be employed a P valve having no-function of failure detection. To prevent the rear wheels from locking before the front wheels, the P-valves 4A, 4B are constructed so as to reduce the fluid pressure of the rear-wheel brakes 2A, 2B in proportion to the fluid pressure of the front-wheel brakes 1A, 1B, in accordance with the outlet side pressure of the master cylinder 2 detected by means of the pressure detection holes 6a, 6b; and in addition, should a defect arise, to cancel the proportional decompression of the P-valves 2A, 2B of the other circuit and increase the fluid pressure of the rear-wheel brakes 2A, 2B.

As in an anti-lock hydraulic control device such as that described above the rear wheels are generally most likely to lock when, apart from the driver, the car is unladen (i.e. when empty), the characteristics of the P-valves are set accordingly.

However, the ideal distribution of fluid pressure to the front-wheel and rear-wheel brakes when the car is carrying goods and passengers (i.e. when laden) calls for greater distribution to the rear-wheel side than when the car is empty. Thus with hydraulic distribution set for when the car is empty, braking force distributed to the rear wheels is unduly low compared with the ideal braking force.

In such circumstances, the subsequently overloaded front wheels have a tendency to lock before the deceleration of the car, which could be achieved if the ideal distribution was originally provided can be reached, and the anti-locking device goes into operation. If the driver then presses the brake pedal further, the rear-wheel brakes can immediately be increased. However, as it is generally believed that the operation of the anti-locking device is a warning that the brakes have been applied too hard, drivers often do not press the brake pedal any harder.

With the anti-lock hydraulic control device shown in FIG. 6, anti-locking control is actuated only in the front-wheel brakes, as rear-wheel brake fluid pressure is controlled by the P-valve. There is thus insufficient braking power in the rear-wheel brakes, which in turn results in insufficient braking power for the whole car; and so despite the installation of an anti-lock hydraulic control device, there is the problem that the braking distance increases.

An example of a means of solving the above problem is the anti-lock brake system described in Japanese Utility Model Application No. 3-47185. In this example, the brake pressure of the other brake circuit is detected by means of pressure detection holes. When said pressure is low, a P-valve with the function of suppressing the ordinal proportional decompression function of the P-valve (i.e. a defect-countering P-valve) is used to suppress the proportional decompression function which detected anti-lock control being actuated in the front-wheel brakes of the other circuit, and the brake pressure of the rear-wheel brakes is increased.

Use of a defect-countering P-valve in the anti-lock brake system described above leads inevitably to increases in size and cost, as compared with use of a normal P-valve. In addition, the defect-countering P-valve is constructed so that rear-wheel brake pressure rises suddenly when anti-lock is actuated on the front-wheel side. There is thus the possibility that the rear wheels may lock suddenly and stability be lost.

SUMMARY OF THE INVENTION

The object of the present invention is therefore to provide an anti-lock hydraulic control device which solves these problems, avoiding the problem of insufficient rear-wheel braking power when the anti-locking device is in operation with minimum cost and size, and increases braking efficiency.

In accomplishing the aforementioned objects, there is provided an anti-lock hydraulic control device comprising a first front-wheel brake and a first rear-wheel brake for actuating brake control by means of a first hydraulic circuit which is connected to the master cylinder and distributes hydraulic fluid; a first front-wheel side control valve and a first rear-wheel side control valve between the master cylinder and first front-wheel brake, and between the master cylinder and first rear-wheel brake respectively, for controlling the inlet of hydraulic fluid to the first front-wheel brake and first rear-wheel brake; a first reserve between the first front-wheel side control valve and first rear-wheel side control valve for temporarily storing hydraulic fluid discharged from the first front-wheel side control valve and first rear-wheel side control valve; a first proportioning valve between the master cylinder and first rear-wheel side control valve for the proportional decompression of the first rear-wheel brake in relation to the first front-wheel brake; and a first pump which is connected to the first reserve, has a discharge opening connected between the first proportioning valve and first rear-wheel side control valve, and is driven by a motor so as to pump out hydraulic fluid stored in the first reserve and discharge on the side of the first rear-wheel side control valve, the pump being driven by the motor when anti-lock control is started, so as to increase brake fluid pressure.

Further, the anti-lock hydraulic control device may comprise a second hydraulic system which is constructed identically to the first hydraulic system, disposed in a car and provided with a second front-wheel brake and second rear-wheel brake; second front-wheel control valve and second rear-wheel control valve; second reserve; second proportioning valve; and second pump, the pumps for the first hydraulic system and the second hydraulic system being driven by a common motor, and the first pump of the first hydraulic system and the second pump of the second hydraulic system being driven simultaneously by the motor when anti-lock control has begun so as to increase the brake fluid pressure of the first rear-wheel side control valve of the first hydraulic system, and the brake fluid pressure of the second rear-wheel side control valve of the second hydraulic system.

Moreover, the anti-lock hydraulic control device may comprise a third hydraulic system disposed in a car and different from the first hydraulic system, and provided with a third front-wheel brake and third rear-wheel brake for brake control by means of a hydraulic system which is connected with the master cylinder and distributes hydraulic fluid; a third front-wheel side control valve between the master cylinder and third front-wheel brake, for controlling the inlet of hydraulic fluid to the third front-wheel brake; a copy valve between the master cylinder and third rear-wheel brake, and connected between the first rear-wheel side control valve of the first hydraulic circuit and the first rear-wheel brake, for conveying the same pressure to the third rear-wheel brake of the third hydraulic system as that applied to the first rear-wheel brake of the first hydraulic system; a third reserve between the third front-wheel side control valve and the copy valve, for temporarily storing hydraulic fluid discharged from the third front-wheel side control valve and the copy valve; and a third pump which is connected to the third receiver, has a discharge opening connected between the master cylinder and copy valve, and is driven by a motor to pump out hydraulic fluid stored in the third receiver and discharge on the copy-valve side, whereas the first pump of the first hydraulic system and the third pump of the third hydraulic system are driven simultaneously by the motor when anti-lock control has started so that the brake fluid pressure of the first rear-wheel side control valve of the first hydraulic system and the brake fluid pressure of the copy valve of the third hydraulic system are increased; and simultaneously, the copy valve of the third hydraulic system conveys the same pressure to the third rear-wheel brake of the third hydraulic system as that conveyed by the first rear-wheel side control valve of the first hydraulic system to the first rear-wheel brake.

As the anti-lock hydraulic control device according to the present invention is constructed so that the inlet port of the proportioning valve is connected to the master cylinder, and the outlet port is connected to the rear-wheel side control valve and discharge opening of the pump, brake fluid control can be actuated by reducing by means of the P-valve rear-wheel brake fluid pressure in proportion to master cylinder fluid pressure, i.e. in proportion to front-wheel brake fluid pressure, until anti-lock control of the front-wheel brakes is begun.

Further, the pump functions when anti-lock control of the front-wheel brakes is begun, discharging hydraulic fluid from the front-wheel side brakes via the reserve, and out between the P-valve and rear-wheel side control valve. Consequently, rear-wheel side brake pressure increases, notwithstanding the proportional decompressing effect of the P-valve, and the distribution of fluid pressure between the front wheels and rear wheels approaches the ideal distribution without the driver pressing the brake pedal any further after anti-lock control has begun.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 6 is a structural diagram showing a conventional anti-lock hydraulic control device.

DETAILED DESCRIPTION OF THE PREFERRED EMBODIMENTS

The embodiments of the present invention will be described below with reference to the accompanying drawings.

Figure 1:
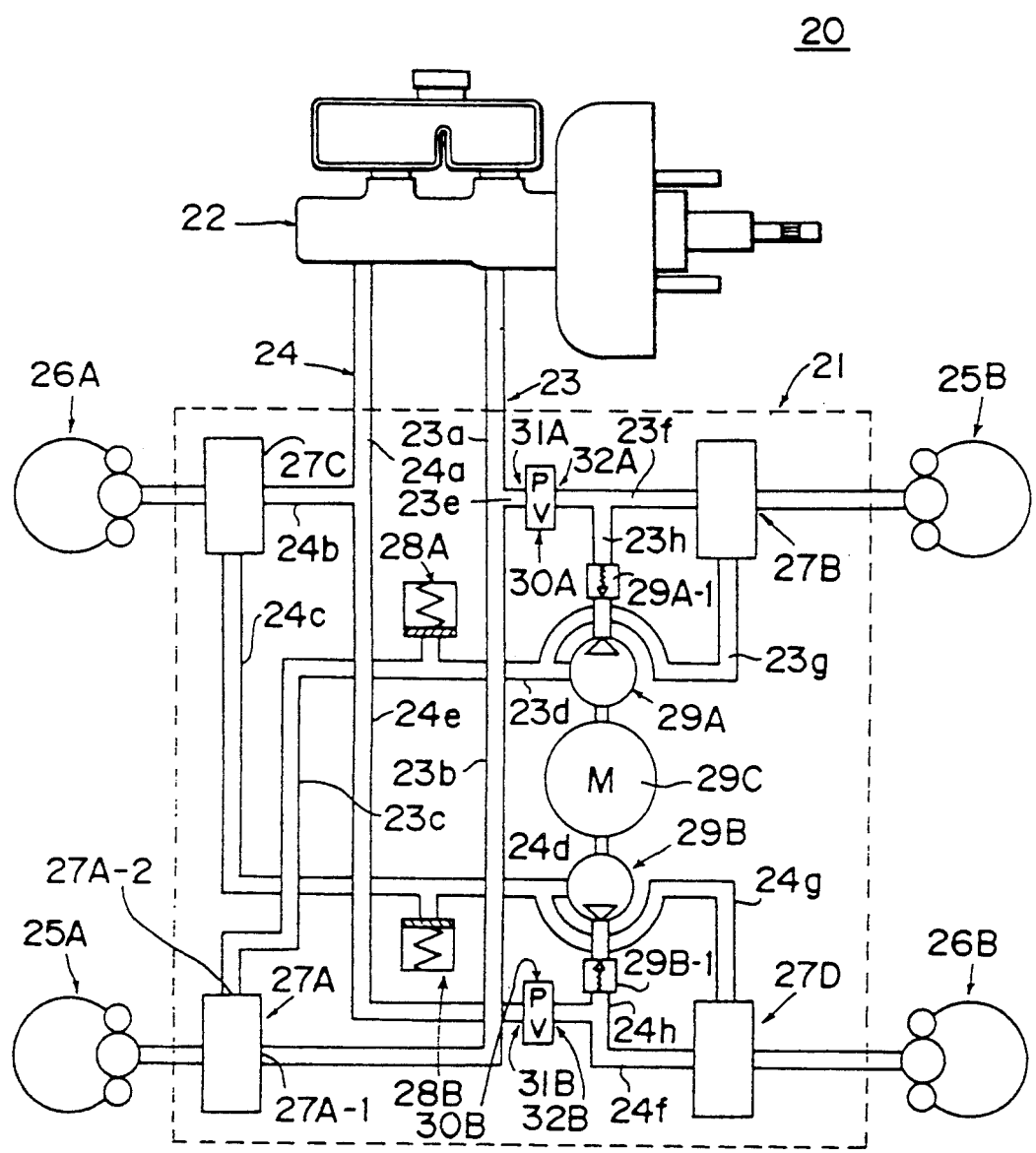
FIG. 1 is a structural diagram showing an anti-lock hydraulic control device according to a first embodiment of the present invention.
Figure 2:
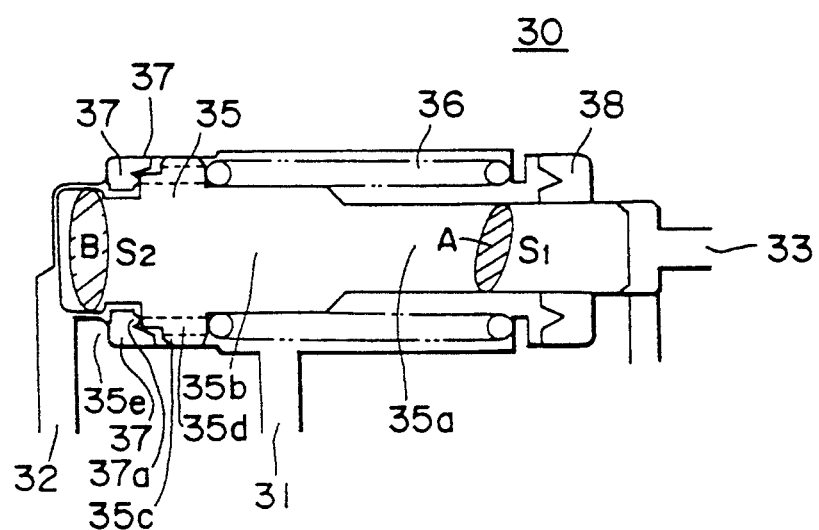
FIG. 2 is a sectional view of a proportioning valve.
Figure 3:
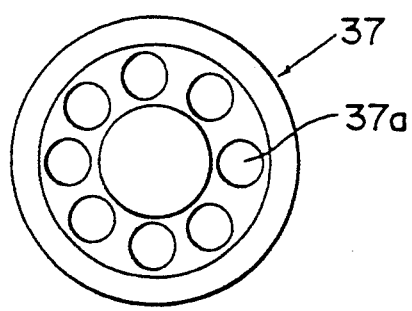
FIG. 3 is a plan view of a part of FIG. 2.

FIG. 1 through FIG. 3 show a first embodiment of the present invention. FIG. 1 shows a brake system 20 for front-wheel drive which includes an anti-lock hydraulic control device 21.

A first hydraulic circuit 23 and a second hydraulic circuit 24 are disposed from the master cylinder 22 in the brake system 20. The first hydraulic circuit 23 connects the master cylinder 22 with the first front-wheel brake 25A on the left side of the car and the first rear-wheel brake 25B on the right side of the car. The second hydraulic circuit 24 connects the master cylinder 22 with the second front-wheel brake 26A on the right side of the car, and the second rear-wheel brake 26B on the left side of the car.

Piping 23a, which serves as the first hydraulic circuit, is connected to the master cylinder 22 and separates in two directions at the ends: piping 23b distributes hydraulic fluid from the master cylinder 22 to the first front-wheel brake 25A; and piping 23e distributes hydraulic fluid from the master cylinder 22 to the first rear-wheel brake 25B.

In the first hydraulic circuit 23, a first front-wheel side control valve 27A and a first rear-wheel side control valve 27B for independently controlling the pressure of the first front-wheel brake 25A and the first rear-wheel brake 25B respectively are disposed between the master cylinder 22 and the first front-wheel brake 25A, and the master cylinder 22 and the first rear-wheel brake 25B. In addition, a first P-valve 30A for the proportional decompression of the hydraulic fluid of the first rear-wheel brake 25B is disposed between the master cylinder 22 and the first rear-wheel side control valve 27B. Further, a first reserve 28A is provided for temporarily storing hydraulic fluid discharged from the first front-wheel side control valve 27A and first rear-wheel side control valve 27B. The first reserve 28A is connected to the first pump 29A, which is driven by the motor 29C. Hydraulic fluid is thus pumped out of the first front-wheel side control valve 27A and first rear-wheel side control valve 27B and discharged between the first P-valve 30A and rear-wheel side control valve 30A.

The first front-wheel control valve 27A comprises an inlet 27A-1 for introducing hydraulic fluid, and a discharge opening 27A-2 for discharging hydraulic fluid. The inlet 27A-1 is connected to piping 23a by piping 23b. By such means, the first front-wheel control valve 27A conveys fluid pressure from the master cylinder 22 by piping 23a, 23b to the first front-wheel brake 25A, thus making possible brake control.

Further, as the first rear-wheel side control valve 27B has the same construction as the first front-wheel side control valve 27A, and is connected with the first P-valve 30A by piping 23f so that hydraulic fluid controlled by means of the first P-valve 30A is conveyed to the first rear-wheel brake 25B, brake control proportionately decompressed in relation to the first front-wheel brake 25A can be provided.

The first reserve 28A is connected to the discharge opening 27A-2 of the first front-wheel control valve 27A and first rear-wheel side control valve 27B by piping 23c and piping 23g, and temporarily stores hydraulic fluid discharged from the first front-wheel control valve 27A and first rear-wheel side control valve 27B.

The pump 29A is connected to the first reserve 28A by the discharge 23d, and pumps up and sucks out by means of the motor 29C hydraulic fluid temporarily stored in the first reserve 28A.

The first P-valve 30A comprises a sectionally circular convex plunger 35 disposed in a housing 34 provided with an inlet port 31, outlet port 32 and atmospheric pressure port 33, as shown in FIG. 2. In addition, a lip seal 37 and cup seal 38 are disposed in the outlet port 32 and atmospheric pressure port 33 of the housing 35 respectively.

The inlet port 31 of the first P-valve 30A is connected by piping 23e to piping 23a, and is thus connected to the master cylinder 22 by piping 23a, 23e. In addition, the outlet port 32 is constructed so as to proportionately decompress and convey fluid pressure from master cylinder 22 to the first rear-wheel side control valve 27B described below, thus effecting control of the first rear-wheel brake.

A spring 36 is disposed between plunger 35 and the housing 35. Plunger 35 normally exerts an urging force F against the side of the outlet port 32, and is enclosed in liquid so as to slide freely with the lip seal 37 between the housing 35.

The plunger 35 is formed in a convex shape from a projecting portion 33a located on the side of the atmospheric pressure port 33, and a base plate 33b on the side of the outlet port 32. The base plate 33b is set with a slight gap opened between the periphery of the outlet port 32 part of the housing 34.

A flange portion 33c is provided on the outside protruding along the periphery of the approximately central part of the basic plate portion 33b, and a groove portion 35e wider than the lip seal 37 is provided toroidally on the side of the outlet port 32 adjacent to the flange portion 33c along the periphery of the basic plate portion 33b.

As the dotted lines in FIG. 2 indicate, liquid flow holes 35d are indented in the flange portion 33c of the plunger 35. Further, the lip seal 37 is provided with hemispherical protruding portions 37a, as shown in FIG. 3, by which means hydraulic fluid inlet from inlet port 31 can normally flow through to the groove 35e of the plunger 35.

The lip seal 37 can freely connect with and separate from the plunger 35, and is set so that when in contact with the plunger 35, the lip seal 37 hinders the flow of liquid from the inlet port 31 to the outlet port 32, and permits fluid flow in the reverse direction from the outlet port 32 to the inlet port 31.

The following is a description of the working of a P-valve of the above construction, where the sectional area of the protruding portion 35a is S1, and the sectional area of the basic plate portion 35b is S2 (S2 > S1).

Hydraulic fluid is first inlet from the inlet port 31 by pressure from the master cylinder 22 when the driver presses the brake pedal. At this time, the pressure of the inlet port 31 and outlet port 32 from the master cylinder 22 is less than F/S1, and so the urging force F of the spring 36 overcomes the pressure of the hydraulic fluid, and the periphery of the plunger 35 and the lip seal 37 are separated. Hydraulic fluid can thus flow freely through between the inlet port 31 and the outlet port 32.

Pressure from the master cylinder 22 increases, and the pressures of the inlet port 31 and outlet port 32 rise together, exceeding F/S1. As the pressure is greater than the urging force F of the spring 36, the plunger 35 moves to the side of the atmospheric port 33, where pressure is lower. This is indicated by point A in FIG. 4. The lip seal 37 of the periphery of the plunger 35 makes contact, and the outlet port 32 is isolated from the inlet port 31.

If pressure from the master cylinder 22 is further increased when in this isolated state, only pressure on the side of the inlet port 31 is increased. Due to the relation S2 > S1, the plunger 35 moves to the side of the outlet port 32, where pressure is lower, and so inlet port 31 and outlet port 32 are connected, thus effecting hydraulic fluid distribution.

The pressures of the inlet port 31 and outlet port 32 equalize due to the above hydraulic fluid distribution, but as the pressure of the outlet port 32 in this state is greater than F/S1 (i.e. greater than the urging force F exerted by the spring 36), the plunger 35 again moves to the side of the atmospheric pressure port 33. Thus distribution of hydraulic fluid from the outlet port 32 is again isolated, and the pressure of the inlet port 31 increases.

The above process is continued until the brake pedal is released and the increase in hydraulic fluid pressure from the master cylinder 22 is stopped.

The equilibrium of forces working on plunger 36 for effecting the above action is as follows:

$$F + Pin \times (B - A) = Pout \times B.$$

$$Pout = (B-A)/B \times Pin + F/B$$

(when $Pin \geq F/A$)

where Pin is the fluid pressure of the inlet port 31, and Pout is the fluid pressure of the outlet port 32.

However, when the driver releases the brake pedal (point C in FIG. 4), the increase in pressure from the master cylinder 22 stops. The periphery of the plunger 35 and the inner circumference of the lip seal 37 are at this time in a state of contact, but capacity on the side of the outlet port 32 increases due to the movement of the plunger 35 so as to maintain the equilibrium in the above equation, and thus Pout falls approximately in accordance with the above equation.

When the movement of the plunger reaches the limit and is mechanically restrained (point B in FIG. 4), Pout is uniform until Pin/Pout, and no further increase in capacity is effected.

When Pin<Pout, as it becomes possible for hydraulic fluid on the side of the outlet port 32 to return to the side of the inlet port 31 passing along the periphery of the lip seal 37, decompression occurs with Pout slightly greater than Pin.

Presently, with the said decompression, $Pin \geq F/A$, and the urging force F exerted by the spring 36 overcomes fluid pressure. The plunger 35 thus returns to a state where it is urged to the side of the output port 32 by the spring 36, and hydraulic fluid flows freely between the inlet port 31 and the outlet port 32, equalizing the pressures of the inlet port 31 and outlet port 32.

The P-valve according to the present invention is not limited to the above construction, and may be of any construction that effects the process which acts as described above. Use of a P-valve of the above description is optimal in the present invention.

The first pump 29A is provided with a discharge portion 29A-1 with a reverse stop valve function, and is connected to the first reserve 28A by piping 23d. The discharge portion 29A-1 is connected to piping 23f between the first P-valve 30A and the first rear-wheel side control valve 27B by piping 23h.

The pump 29A pumps out and sucks up by means of a motor 29C hydraulic fluid stored in the first receiver 28A, discharging the hydraulic fluid on the side of the first rear-wheel side control valve 27B and increasing the pressure of the hydraulic fluid of the first rear-wheel side control valve 27B.

As the second hydraulic circuit has a construction identical to that of the first hydraulic system 23, using a right-side second rear-wheel brake 26A in a car and a left-side second rear-wheel brake 26B in a car, a second reserve 28B, a second P-valve 30B and a second pump 29B, a detailed description will be omitted.

It should be noted that one common motor 29C is used for the motor 29C provided for the first pump 29A and second pump 29B, and that the pump 29A and pump 29B are driven simultaneously by the motor 29C.

Figure 4:
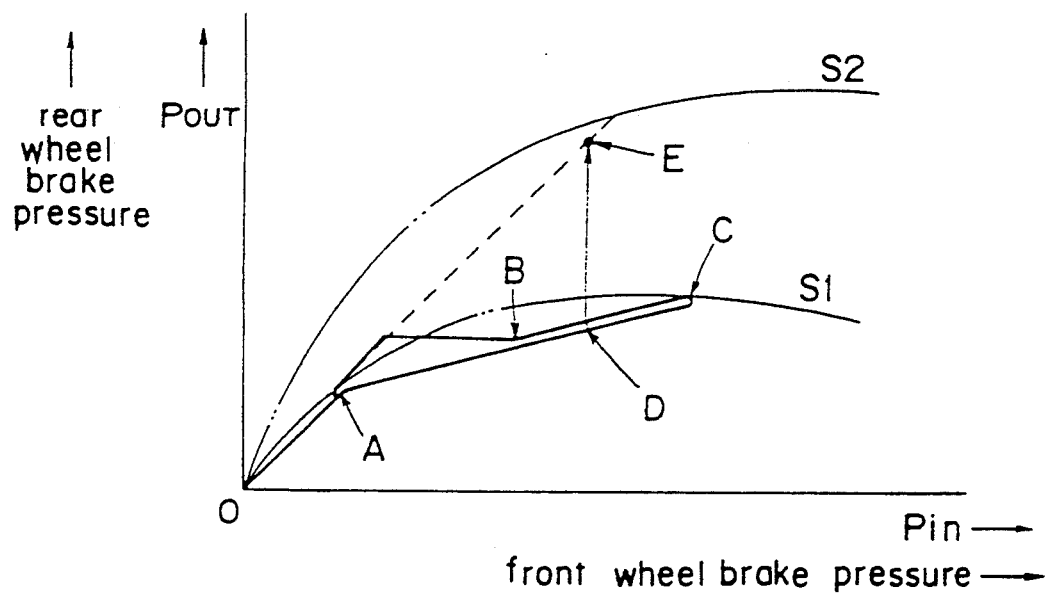
FIG. 4 is a rear-wheel brake fluid pressure/front-wheel brake fluid pressure chart showing the operation of the first embodiment.

FIG. 4 shows the working characteristics of the first and second P-valves 30, with Pin (fluid pressure on the inlet port side) as the horizontal axis and Pout (fluid pressure on the outlet port side) as the vertical axis. When anti-lock control is not in effect, Pin is equal to the pressure of the first front-wheel brake 25A and the second front-wheel brake 29A, and Pout is equal to the pressure of the first rear-wheel brake 25B and the second rear-wheel brake 26B.

Curve S1 in FIG. 4 shows the ideal hydraulic distribution to the front wheels when the car is unladen, and curve S2 shows the ideal hydraulic distribution to the front wheels when the car is laden with goods and passengers.

The graph indicated by the solid line in FIG. 4 is the fluid pressure of the rear-wheel brake, and the graph shown by the dotted line is the fluid pressure of the front-wheel brake.

In the present embodiment, the P-valve is set so as to adjust rear-wheel brake hydraulic distribution in accordance with when the car is empty. Accordingly, braking power less than curve S2 shown in FIG. 4 is distributed to the rear wheels.

The following is a description of the working of a brake system 20 of the above construction with reference to FIG. 1 and FIG. 4.

First, when the driver presses the brake pedal (not shown in drawings), the fluid pressure of the hydraulic fluid is conveyed from the master cylinder 22 through the first and second hydraulic circuit 23, 24 by piping 23a, 24a directly to the first front-wheel brake 25A and the second front-wheel brake 26A, and fluid pressure is simultaneously conveyed to the first rear-wheel brake 25B and the second rear-wheel brake 26N via the first P-valve 30A and second P-valve by piping 23f, 24f.

As pressure inside the P-valve does not exceed F/S1, as described above, fluid pressure conveyed to the first rear-wheel brake 25B and second rear-wheel brake 26B is of the same pressure as that of the first front-wheel brake 25A and second front-wheel brake 26A.

If the driver continues to press the brake pedal, pressure conveyed from the master cylinder increases. When it increases from the point in FIG. 4 to the point A, the first P-valve 30A and second P-valve 30B operate, and brake control is effected with proportional decompression in the first rear-wheel brake 25B and the second rear-wheel brake 26B.

Next, taking point D in FIG. 4 as the point where the tendency to lock begins, the control valves 27A, 27C for the front wheels are activated by a command from a detector (not shown in drawings) at point D, thus actuating anti-lock control. The first front-wheel brake 25A and second front-wheel brake 26A discharge hydraulic fluid from the discharge openings 27A-2 and 27B-2, and the first reserve 28A and second reserve 28B temporarily store the hydraulic fluid. Simultaneously, the first pump 29A and second pump 29B are driven by the motor 29C.

If the driver presses the brake pedal further while the first pump 29A and the second pump 29B are working, both the first rear-wheel brake 25N and the second rear-wheel brake 26B cause a tendency to lock of rear-wheels, and normal anti-lock control is started. However, the driver at this point interprets the start of anti-lock control as a warning against excessively applying the brakes, and so it can be assumed that the brake pedal does not press any further.

Pressure from the master cylinder 22 thus could become uniform. The first rear-wheel brake 25B and the second pump 29B supply hydraulic fluid from the first reserve 28A and second pump 28B from the master cylinder 22 via the first P-valve 30A and the second P-valve 30B, and hydraulic fluid is discharged from the discharge openings 29A-1, 29B-1 from the side of the outlet ports 32A, 32B of the first pump 30A and second pump 30B.

The first pump 29A and the second pump 29B discharge hydraulic fluid, thus causing the plunger 35 to move and the capacity on the side of the outlet ports 32A, 32B to increase. Capacity does not increase any further, however, due to the limits on the movement of the plunger 35. Consequently, hydraulic fluid discharged from the pump makes for the rear-wheel brake and, disregarding the functions of the first P-valve 30A and second P-valve 30B, increases the pressure of the first rear-wheel brake 25B and second rear-wheel brake 26B.

The increase in pressure of the first rear-wheel brake 25B and second rear-wheel brake 26B reaches point E in FIG. 4. If at this point the pressure of the outlet ports 32A, 32B exceeds the pressure from the master cylinder 22, hydraulic fluid on the side of the outlet ports 32A, 32B flows back along the periphery of the lip seal 37 to the side of the inlet ports 31A, 31B, so that the point E is not exceeded.

It should be noted that it has no bearing on the effects of the present invention whether or not brake control of the first rear-wheel brake 25B and second rear-wheel brake 26B is started while brake pressure of the first rear-wheel brake 25B and second rear-wheel brake 26B is reaching point E.

In addition, the supply of hydraulic fluid by the pumps 29A, 29B is set so that the pressure of the outlet ports 32A, 32B of the first P-valve 30A and second P-valve 30B increases gradually and sudden increase of brake pressure does not occur.

The present invention is not limited to the construction described above, and may be constructed as shown in FIG. 5.

Figure 5:
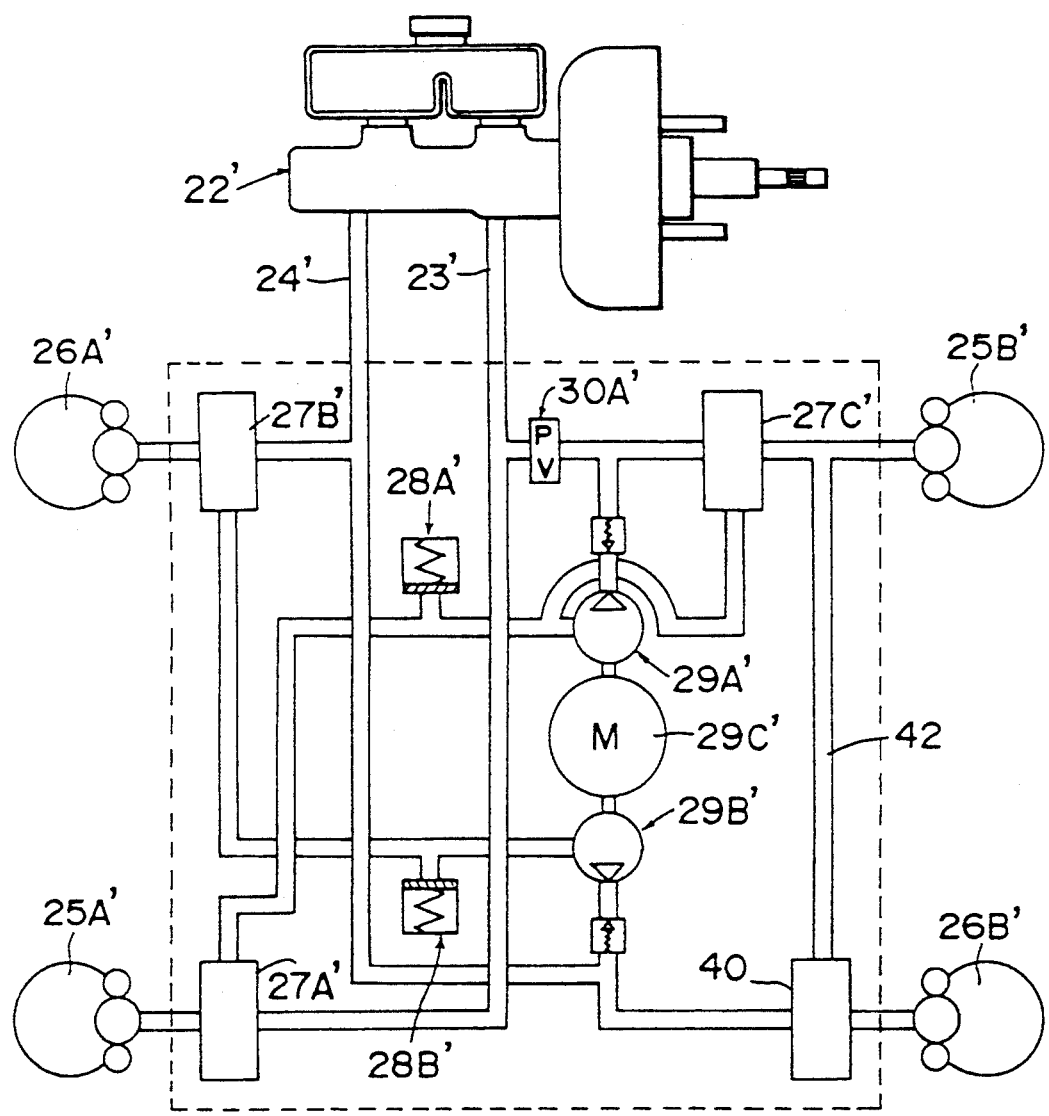
FIG. 5 is a structural diagram showing a second embodiment.

According to the second embodiment shown in FIG. 5, there is provided a brake system comprising a first' hydraulic circuit 23' with a construction identical to that of the first hydraulic system 23 in the first embodiment, and a third hydraulic system 41. A copy valve 40 is provided in place of the second rear-wheel side control valve 27D of the first embodiment for control of the third rear-wheel brake 26B' of the third hydraulic system 41. A P-valve is therefore not required in the third hydraulic system 41.

The copy valve 40 is disposed between master cylinder 22' and the third rear-wheel brake 26B', and is connected to the first' rear-wheel side control valve 27C' and the first' rear-wheel brake 25B' of the first' hydraulic system by piping 42. By such means, the copy valve detects pressure conveyed by the first' rear-wheel side control valve 27B' to the first' rear wheel brake 25B', and has the function of conveying the same pressure to the third rear-wheel brake 26B'.

As according to the second embodiment the roles played by the P-valve of the second hydraulic system and the rear-wheel side control valve of the first embodiment are played only by the copy valve 40, the same roles of the first embodiment may be fulfilled with fewer components, and consequently at lower cost.

A detailed description is omitted because apart from the construction outlined above, the construction is the same as that of the first embodiment.

The following is a description of the working of the second embodiment constructed as described above. Firstly, by means of the driver pressing the brake pedal in the car (not shown in the drawings), the fluid pressure of the hydraulic fluid from the master cylinder is conveyed through the first' hydraulic system 25A' and the third hydraulic system 41 to the first' front-wheel brake 25A and the third front-wheel brake 26A'. Simultaneously, decompression is conveyed to the first' rear-wheel brake 25B' and the third rear-wheel brake 26B' via the first' rear-wheel side control valve 27B' and the third P-valve 30A'. The same pressure is conveyed to the front-wheel side brake and rear-wheel side brake.

If the driver continues to press the brake pedal, fluid pressure conveyed by the master cylinder 22 increases. The third P-valve 30A' functions at point A in FIG. 4, so that proportionately decompressed hydraulic fluid effects brake control of the rear-wheel brake 26B' via the third control valve 27B'.

Simultaneously, the copy valve 40 detects the supply fluid pressure of the first' rear-wheel side control valve 27B' via piping 42 by means of a detector (not shown in the drawings), and conveys the identical fluid pressure only to the rear-wheel brake 25B.

Next, when the tendency to lock at point D in FIG. 4 begins, the first' front-wheel use control valve 27A' and the third front-wheel side control valve 27C' operate in accordance with an instruction from the detector (not shown in the drawings) at point D, the front-wheel brakes 25A', 26A' discharge hydraulic fluid from the discharge openings 27A-2', 27B-2', and the first' reserver 28A' and third reserve 28B' temporarily store the hydraulic fluid. Simultaneously, the first' pump 29A' and third pump 29B' are driven by the motor 29C', increasing the fluid pressure of the first' rear-wheel brake 25B' and the third rear-wheel brake 26B'.

With the pumps in an operational state, the pressure of the master cylinder 22', which is depend on the driver's pedal effort, could become and the hydraulic fluid which flows from the master cylinder 22' through the first' P-valve 30A' to the rear-wheel brake could stop if the driver does not press the brake pedal any further. However, the first' pump 29A pumps hydraulic fluid out from the first' receiver 28A' and discharges it from the discharge opening 29A-1' on the side of the outlet port 32A' of the first' P-valve 30A'.

Through the discharge of hydraulic fluid by the first' pump 29A', the plunger 35 moves, thus increasing capacity on the side of the outlet port 32A'. Capacity does not increase any further, though, as it is restrained by the limits of movement of the plunger. Consequently, hydraulic fluid discharged from the first' pump 29A' heads for the first' rear-wheel brake 25B' and, disregarding the functions of the first' P-valve 30A', increases fluid pressure in the first' rear-wheel side control valve 27B', thus actuating brake control of the first' rear-wheel brake 25B'.

Fluid pressure supplied to the first' rear-wheel side control valve 27B' is detected via piping 42 by copy valve 40, which conveys the same pressure as the first' rear-wheel side control valve 27B' to the third rear-wheel brake 26B'.

In this way, the second embodiment can perform similar roles to the first embodiment through the use of the copy valve 40.

As the foregoing description makes clear, the provision of pump discharge openings between the control valve of the rear-wheel brake and the outlet port of the P-valve in an anti-lock hydraulic control device according to the present invention makes it possible to increase the pressure of the rear-wheel brakes until it reaches the same pressure as that from the master cylinder, regardless of the characteristics of the P-valve. Thus even if the driver does not usually press the brake pedal when anti-lock control of the front-wheel side starts, pressure in the front wheels and rear wheels can approach the ideal distribution.

Pressure increases, and is limited by the discharge capacity of the pump and the quantity of hydraulic fluid discharged from the front-wheel brake side. Accordingly, the rear-wheel brakes are applied smoothly without sudden locking. In addition, as the P-valve may be of normal size, there are a number of other advantages, such as reduced cost.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An anti-lock hydraulic control device comprising: a first front-wheel brake and a first rear-wheel brake for actuating brake control by means of a first hydraulic circuit connected to a master cylinder so as to distribute hydraulic fluid; a first front-wheel side control valve and a first rear-wheel side control valve between said master cylinder and first front-wheel brake, and said master cylinder and first rear-wheel brake respectively, for controlling the inlet of hydraulic fluid to said first front-wheel brake and first rear-wheel brake; a first reserve between said first front-wheel side control valve and first rear-wheel side control valve for temporarily storing hydraulic fluid discharged from the first front-wheel side control valve and first rear-wheel side control valve; a first proportioning valve between said master cylinder and first rear-wheel side control valve for actuating brake control by proportional decompression of the first rear-wheel brake in relation to the first front-wheel brake; and a first pump connected to said first reserve and provided with a discharge opening connected between said first proportioning valve and first rear-wheel side control valve for pumping out by means of a motor hydraulic fluid stored in the first reserve and discharging on the side of the first rear-wheel side control valve, said pump being driven by a motor so as to increase brake fluid pressure of the rear-wheel side control valve when anti-lock control is started.

2. An anti-lock hydraulic control device in accordance with claim 1 comprising a second hydraulic system in a car, with a construction identical to that of said first hydraulic system and provided with: a second front-wheel brake and a second rear-wheel brake; second front-wheel side control valve and second rear-wheel side control valve; second reserve; second proportioning valve; and second pump, the pumps of the first hydraulic system and second hydraulic system being driven by a common motor, whereas the first pump of the first hydraulic system and the second pump of the second hydraulic system are driven simultaneously by the motor when anti-lock control has begun so as to increase the brake fluid pressure of the first rear-wheel side control valve of the first hydraulic system and the brake fluid pressure of the second rear-wheel side control valve of the second hydraulic system.

3. An anti-lock hydraulic control device in accordance with claim 1 comprising a third hydraulic system different from said first hydraulic system in a car, and provided with: a third front-wheel brake and third rear-wheel brake for effecting brake control by means of a hydraulic system which is connected to the master cylinder and distributes hydraulic fluid; a third front-wheel side control valve between said master cylinder and third front-wheel brake, for controlling the inlet of hydraulic fluid to the third front-wheel brake; a copy valve between said master cylinder and third rear-wheel brake and connected to the first rear-wheel side control valve and first rear-wheel brake so as to convey the same pressure to the third rear-wheel brake of the third hydraulic system as that applied to the first rear-wheel brake of the first hydraulic system; a third reserve between said third front-wheel side control valve and copy valve for temporarily storing hydraulic fluid discharged from the third front-wheel side control valve and the copy valve; and a pump connected to said third reserve and provided with a discharge opening connected between said master cylinder and copy valve for pumping out by means of a motor hydraulic fluid stored in the third reserve and discharging on the side of the copy valve, whereas the first pump of the first hydraulic system and the third pump of the third hydraulic system are driven simultaneously by the motor so as to increase the brake fluid pressure of the first rear-wheel side control valve of the first hydraulic system and the copy valve of the third hydraulic system when anti-lock control is started, while at the same time, the copy valve of the third hydraulic system conveys the same pressure to the third rear-wheel brake of the third hydraulic system as the brake fluid pressure conveyed by the first rear-wheel side control valve of the first hydraulic system to the first rear-wheel brake.

* * * * *

UNITED STATES PATENT AND TRADEMARK OFFICE
CERTIFICATE OF CORRECTION

PATENT NO. : 5,320,423
DATED : June 14, 1994
INVENTOR(S) : Koichi Hashida

It is certified that error appears in the above-indentified patent and that said Letters Patent is hereby corrected as shown below:

On the title page, item [75], Inventor, line 1, change "Itami" to --Itami-shi--.
Column 11, line 51 (claim 2, line 5) delete "a" after "and".
Column 11, line 51 (claim 2, line 5) insert "a" after "brake;".

Signed and Sealed this

Seventeenth Day of October, 1995

Attest:

BRUCE LEHMAN

Attesting Officer

Commissioner of Patents and Trademarks